Oct. 30, 1923.
H. C. E. ANDERSON
SUN SHELTERING COVER FOR PNEUMATIC TIRES
Filed Aug. 17, 1922
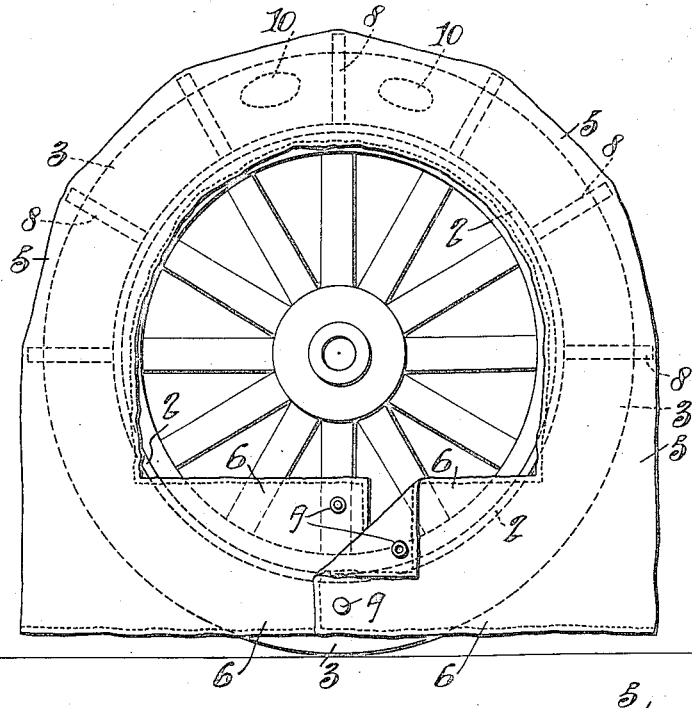
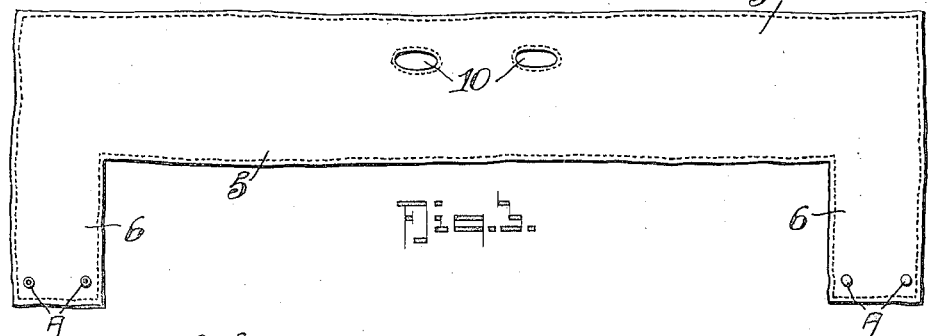
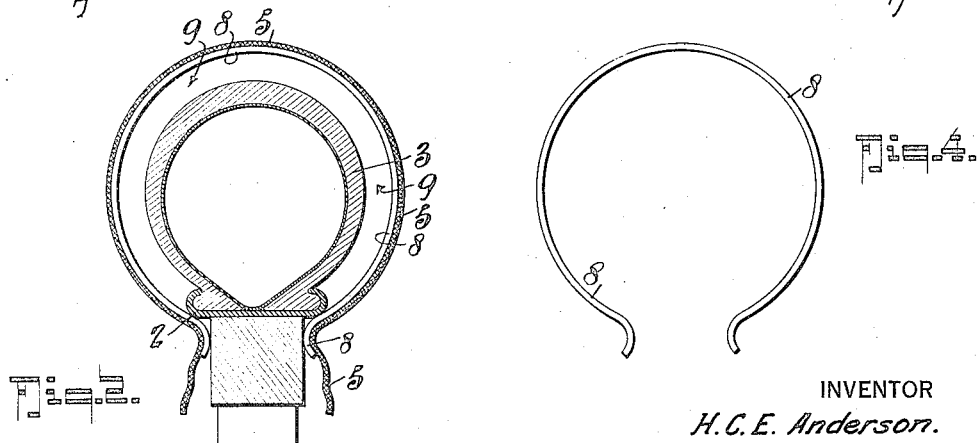
INVENTOR
H.C.E. Anderson.
BY
Fred G. Dieterich & Co.
ATTORNEYS Patented Oct. 30, 1923.

1,472,033

UNITED STATES PATENT OFFICE.

HARLEY C. E. ANDERSON, OF NORTH VANCOUVER, BRITISH COLUMBIA, CANADA.

SUN-SHELTERING COVER FOR PNEUMATIC TIRES.

Application filed August 17, 1922. Serial No. 583,390.

*To all whom it may concern:*

Be it known that I, HARLEY C. E. ANDERSON, citizen of the Dominion of Canada, residing at North Vancouver, in the Province of British Columbia, Canada, have invented certain new and useful Improvements in Sun-Sheltering Covers for Pneumatic Tires, of which the following is a specification.

This invention relates to a readily removable shelter cover for pneumatic tires and is designed to protect the same from the heat of the sun while the vehicle is standing.

Although such shelter covers have heretofore been made for this purpose, and some have been patented, they do not seem acceptable to the owners of automobiles, largely owing to the fact that they are not readily applied and removed from the wheels.

In the device, which is the subject of this application, the shelter cover includes only what is necessary to enclose the pneumatic tire and to support the same from the rim of the wheel with an air space between the tire and its protecting shelter.

The invention is particularly described in the following specification, reference being made to the drawings by which it is accompanied, in which:

Fig. 1 is a side elevation of the wheel showing the cover applied.

Fig. 2 is a cross section of the tire, showing its protective cover and the manner of its attachment.

Fig. 3 is a plan of the cover when laid out flat, and

Fig. 4 is an edge view of the spring clips by which the cover is retained on the rim of the wheel.

In these drawings 2 represents the rim of the wheel and 3 its pneumatic tire. The protective device comprises a plane strip 5 of canvas or the like fabric, (see Fig. 3), of a width sufficient to encircle the cross section of the tire 3 from the rim 2 and of a length sufficient to encircle the half circumference of the tire and reach close to the ground on each side.

At each end of this strip 5 flaps 6 are secured to laterally project from each end, and when on the wheel to extend across from one side to overlap the end of the flap from the other side. These overlapping ends of 6 are provided with dome fasteners 7 or other convenient means for connecting the two sides together approximate the ground line.

Resilient metal clips 8, (see Fig. 4), are secured at intervals apart to the inner side of this cover strip 5, which clips are designed to encircle the cross section of the tire 3 from the rim 2 and to support the canvas cover clear of the tire with an air interspace 9, the ends of the clips exercising a spring grip on the rim 2.

The clips 8 may be inserted in pockets sewn to the inner side of the fabric to be removable therefrom and the strips 5 may have apertures 10 on one side about its midlength, which apertures, when the cover is in use, will be at the inner side of the top of the wheel. These apertures will induce a circulation of cool air through the interspace 9.

A simple and convenient cover is thus provided that, when not in use, will occupy little space and that can readily be applied to the tire, as the cover only requires to be thrown over the upper side of the tire on the wheel and be drawn down, when the ends of the spring clips 8 will slip over the tire and exercise a spring grip on the rim 2 sufficient to retain the cover 5 in place and will preserve the space 9 between the cover and the tire through which air may circulate to prevent the tire becoming overheated.

Having now particularly described my invention, I hereby declare that what I claim as new and desire to be protected in by Letters Patent, is:

1. A removable protective cover for a pneumatic tire, said cover comprising a strip of flexible material adapted in width to encircle the cross section of the tire on the rim and in length to encircle the tire on the wheel and to extend to near the ground on each side, and means for supporting this cover from the rim of the wheel to preserve an air space between the cover and the tire, said means comprising strips of resilient metal bent to encircle the tire in cross section and secured at intervals apart to one face of the cover, the ends of which strips are adapted to exercise a yielding grip on the rim of the wheel.

2. A removable protective cover for a pneumatic tire, said cover comprising a strip of flexible fabric adapted in width to encircle the cross section of the tire on the rim and in length to encircle the tire on the wheel and extend nearly to the ground on each side, a flap extending from one side at each end, means for connecting the ends of the flaps together across the lower part of the wheel, one side of said cover having pockets sewn across it at intervals apart and strips of thin metal bent over the tire and adapted to have a spring hold on the rim of the wheel, said metal strips fitting the pockets of the cover.

3. A removable protective cover for pneumatic tires, said cover comprising a strip of flexible material adapted in width to encircle the cross section of the tire on the rim and in length to encircle the upper half of the tire on the wheel and to extend to near the ground on each side and spring clips for supporting the cover from the rim of the wheel whereby the clips and the cover will be spaced from the tire to preserve an uninterrupted air space between the cover and the tire substantially as shown and described.

In testimony whereof I affix my signature.

HARLEY C. E. ANDERSON.